United States Patent [19]
Berberi

[11] Patent Number: 5,472,576
[45] Date of Patent: Dec. 5, 1995

[54] PROCESS FOR THE RECOVERY OF INDUSTRIAL SOLVENTS AND DILUENTS FROM INDUSTRIAL WASTE

[76] Inventor: Anwar E. Berberi, 622 Dipa Building, Larnaca, Cyprus

[21] Appl. No.: 879,599

[22] Filed: May 7, 1992

[30] Foreign Application Priority Data

Aug. 22, 1990 [FR] France .................. 90 10548

[51] Int. Cl.⁶ .................. B01D 3/14; B01D 3/42
[52] U.S. Cl. .................. 203/3; 203/1; 203/2; 203/81; 203/DIG. 11; 203/DIG. 22; 203/DIG. 25; 202/153; 202/175; 202/176; 202/202; 202/182; 202/235
[58] Field of Search .................. 203/99, 1–3, 81, 203/74, DIG. 25, DIG. 11, DIG. 22; 202/176, 175, 202, 235, 153, 182; 159/47.3; 422/62, 68.1

[56] References Cited

U.S. PATENT DOCUMENTS

| | | | |
|---|---|---|---|
| 60,477 | 12/1866 | Coffey | 202/175 |
| 808,035 | 12/1905 | Gardner | 202/175 |
| 2,405,393 | 8/1946 | Atkins | 203/DIG. 11 |
| 2,953,504 | 9/1960 | Bole et al. | 203/48 |
| 3,687,819 | 8/1972 | Levin | 202/175 |
| 4,401,512 | 8/1983 | Likins | 203/DIG. 11 |
| 4,406,745 | 9/1983 | Martel | 202/175 |
| 4,574,036 | 3/1986 | Henriot | 202/202 |
| 4,708,775 | 11/1987 | McGregor et al. | 159/47.3 |
| 4,980,030 | 12/1990 | Johnson | 159/47.3 |

FOREIGN PATENT DOCUMENTS

| 2610612 | 9/1977 | Germany | 202/175 |
|---|---|---|---|

*Primary Examiner*—Wilbur Bascomb, Jr.

[57] ABSTRACT

A method for the production of an industrial diluent which includes the steps of heating a liquid waste from a facility that manufactures coatings, inks, lacquers, adhesives, or dyes in a mixer-reactor to generate a vapor, flowing the vapor into a distillation column, distilling the vapor to form distillation components, and transferring each component to a tank designated for such component. The method may include the additional steps of mixing at least two of the components in a predetermined amount, and thoroughly mixing the liquid waste during the heating step. The heating step is preferably effected by applying heat substantially uniformly to the liquid waste.

17 Claims, 1 Drawing Sheet

PROCESS FOR THE RECOVERY OF INDUSTRIAL SOLVENTS AND DILUENTS FROM INDUSTRIAL WASTE

TECHNICAL FIELD OF THE INVENTION

The present invention relates to a process and apparatus for the recovery of solvents from liquid solvent wastes of paint, printing ink and resin processes or the like for further use of those solvents as diluents in those processes. The process includes the fractional distillation of the liquid wastes to obtain distillates which are later mixed in predetermined proportions to prepare the diluents which are suitable for the said processes.

BACKGROUND OF THE INVENTION

In the past, the low viscosity liquid wastes from paint, adhesive or ink manufacturing facilities were recycled for use as cleaning solvents in the corresponding factories. The processes used were limited to the simple distillation or the recovery of solvents azeotropically with water. Following the recovery of the solvent, the water was recycled to the boiler by siphon.

None of the prior art processes involved the treatment or recovery of solvents from ink or paint wastes other than the recovery for use as a cleaning agent or some other limited industrial application. It is well known that a cleaning solvent has only limited uses as a diluent. For technical reasons, many formulating parameters should be determined prior to classifying a particular solvent as a diluent in the technical meaning of the word when such solvent has been labeled as a cleaning solvent.

In order to have a good, solvent-based resin matrix, a coating, an adhesive or an ink, it is necessary that the dilution parameters be defined. This could not be possible unless the solvent proportions are very well determined. It is therefore necessary that, when solvents are recovered from the wastes, separation of the solvents be specific.

One of the economic and technical setbacks of the previous processes was the difficulty in separating the hydrophilic solvents (or those that are water soluble) which are very common in the industry from water. Examples of those solvents include ketonic or alcoholic compounds and especially glycols which are highly soluble in water in all proportions and consequently non-recyclable because the water must in all cases be separated from those solvents. The present invention eliminates those technical problems that weighed heavily on previous procedures.

Other problems also arise in prior processes, such as the thermosetting of mud resulting from reactive resins in the presence of water. This causes an industrial-scale operation to be non-viable due to efforts and time required for the removal of the coagulated mud and the cleaning up of the mixer-reactor.

In the apparatus of the present invention, the heating of the liquid waste in the mixer reactor is effected by flowing a thermal fluid through a circular serpent coil which is spread over substantially the entire exterior wall of the reactor and which is circumvented by a an exterior insulator. In that manner, a homogeneous heating all over the heated area with minimum loss of energy is accomplished.

A flexible hose links the outlet of the mixer-reactor to a fractionating column which has many theoretical plates. The fractionating column is connected to a condenser where the first distillate is condensed. The condensed distillate is received in a column which has a level indicator for the volumetric determination of the distillates.

According to the identity of the recovered distillates, the condensed liquid is transferred by a discharge pipe to one of six tanks through two valves, the first valve being at the outlet of the column and the other being at the inlet of the aimed tank. The outlet of each of the six tanks is connected to a seventh tank which is the blending tank to be used for the production of the diluents by mixing distillates from the six tanks.

The process of the present invention is practical, efficient, and simple and differs extensively from other prior processes in that it employs fractional automation, it achieves high yield that could reach up to 95% of petrochemical solvents from the waste liquid volatile, and it produces solvents which are free of color contamination when the waste in question is coming from paint, ink or dye facilities.

Another advantage of the present invention is the absence of danger resulting from pressure build-up caused by mud stacking on the mixer-reactor walls. In the present invention, continuous movement caused by a central rotary anchor of the mixer-reactor vessel ensures homogeneous heating of the mixture. This aspect was absent in the prior procedures which did not take into consideration the piling up of mud in the bottom part of the mixer-reactor even at the time when it reached a level of 20%.

The adopted procedure did not develop the part where the piled up waste in the bottom of the boiler or reactor vessel prevents the spread of heat to the upper levels of the reactor which carries dangers in developing internal pressures mainly when it is the case of a localized heating in the bottom part.

The present invention overcomes the disadvantages of the prior procedures in addition to the fact that it brings a new concept for regenerating solvents used as diluents by the selected fractioning procedure that allows the categoric separation of solvents while minimizing as much as possible the presence of an azeotrope.

These and other objects and advantages of the present invention will be apparent from the following description.

SUMMARY OF THE INVENTION

Liquid solvent waste of a paint, printing ink or resin process or the like is heated in a mixer-reactor with heat provided by a thermal fluid flowing through a coil surrounding the mixer-reactor while the mixture is stirred continuously. The volatiles are vaporized and flow to a distillation column where they are distilled to form certain distillation components. Each of the distillation components are transferred to a corresponding tank which is designated for that component. Appropriate amounts from those tanks are transferred to a blending tank to produce a diluent which is suitable for use in a paint, ink, resin or the like process.

BRIEF DESCRIPTION OF THE DRAWINGS

For a detailed description of the preferred embodiments of the invention, reference will now be made to the accompanying drawings wherein.

DETAILED DESCRIPTION OF THE INVENTION

Figure 1:
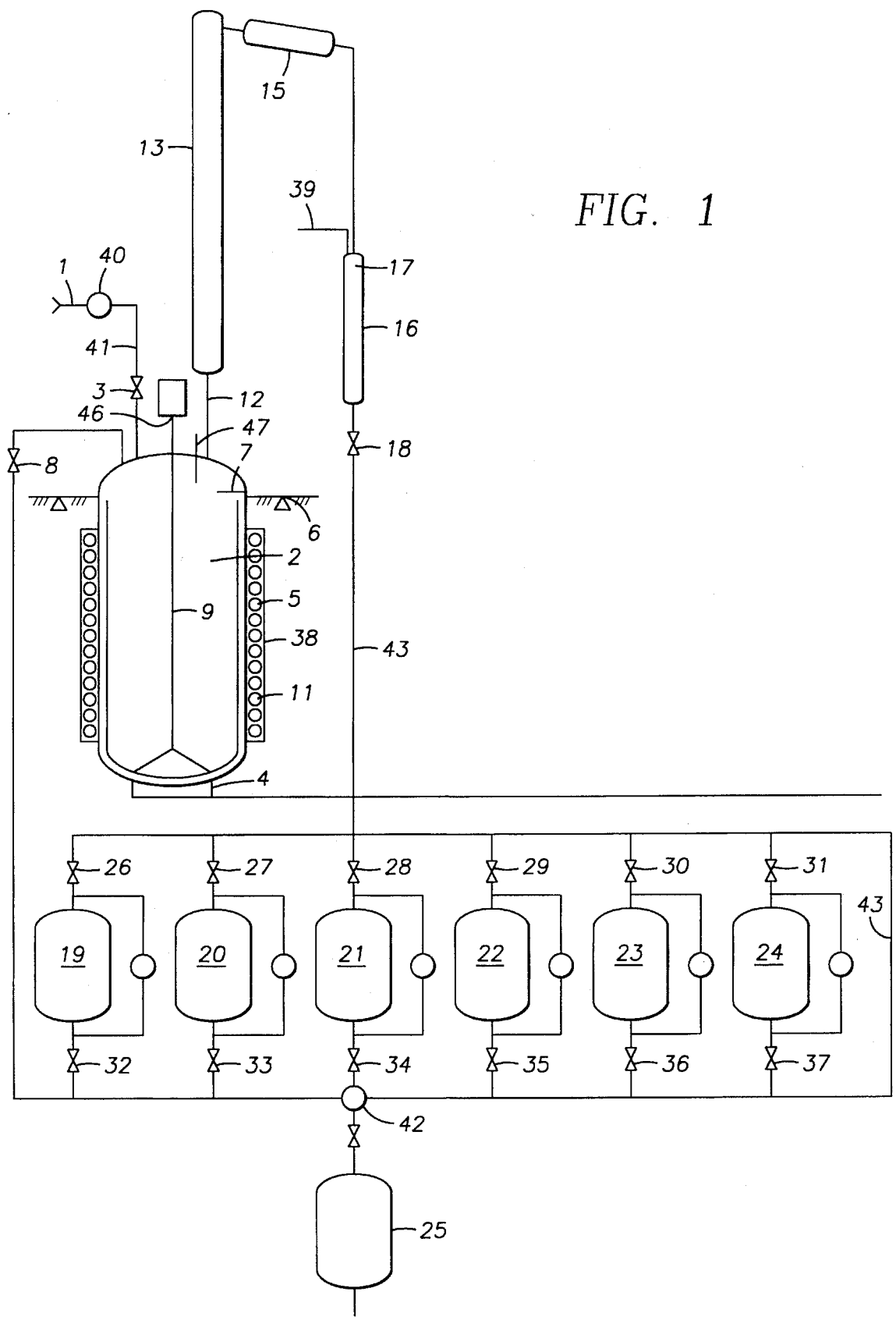
FIG. 1 is schematic depicting the process and apparatus of the present invention

A description of the fractional separation phenomenon is necessary in order to recognize the inventive side of the present invention which is precisely the separation of solvents with the help of a column allowing fractional separation at 2° C. difference at their distillation point.

The separation could be done in a semi-continuous or continuous process to produce the required solvent mixture. The distilled solvents are recovered in column 16 where the distillate is analyzed for chemical identification in order to be sent to one of appropriate tanks 19, 20, 21, 22, 23 or 24, as shown in FIG. 1.

By this process, the solvents are eventually separated according to their distillation temperature as well as according to their chemical identity which is determined after analysis. The operation of the process is described below by making reference to FIG. 1.

The waste is pumped from a waste source 1 by a pump 40 and is introduced in a mixer-reactor 2 through a valve 3 and a pipe 41. A circular serpent coil 11 surrounds the exterior surface of mixer-reactor 2. A thermofluid liquid 5 flows by way of valve 8 through coil 11 and uniformly heats mixer-reactor 2 to the level of waste mixture. A central rotating anchor 9 rotates continuously to provide homogeneous mixing and heating of the mixture therein. An outside insulator 38 encloses coil 11 to minimize heat loss.

As soon as the waste reaches its boiling point, the vapors rise in the mixer-reactor 2 and flow through a flexible hose 12 to reach the first surface of contact in a fractionating column 13. That surface of contact is known as the first theoretical plate. Column 13 exhibits a span of heat exchange surface at equilibrium between the upper rising vapors and the descending distillates. This way, there is a formation of side partial distillations along the inner walls of column 13 on and on again until the distillate becomes saturated by the lower boiling point with a residue saturated by a higher boiling point. The overhead from column 13 is condensed in a condenser 15 and the condensed material therefrom flows to a column 16.

The volume in mixer-reactor 2 diminishes due to the evaporation of an amount of volatile waste. The first volume of solvent reaching the final stage of column 13 is fractionated in order to reach its final liquid-vapor equilibrium state. Its distillation temperature and its vapor pressure are recorded and it is then recovered in column 16. A level indicator 17 determines the volume of the distillates.

The fractionated part is distilled at a constant temperature or in a well defined temperature interval identifying the solvent nature or that of its azeotrope. For an azeotropic solvent mixture that temperature is very well defined as well as for pure solvents.

Hence each family or class of solvents or each azeotrope recovered in column 16 is sent through an outlet discharge valve 18 from column 16 to piping 43 which distributes the distillate to the appropriate tank 19, 20, 21, 22, 23 or 24 via inlet valve 26, 27, 28, 29, 30 or 31, respectively. Hence each tank contains one of the solvent categories such as the aromatics, the ketonics, the alcoholics, the esters and, finally, the glycols and the aliphatics at low aromatic concentration. This does not exclude the possibility of the recovery of many azeotropes with one of those categories according to the diluents production program required which does not present any disadvantages.

The solvents recovered according to their family type could be blended at this stage in very well defined proportions by flowing material in a predetermined amount from tanks 19, 20, 21, 22, 23 or 24 through outlet valves 32, 33, 34, 35, 36 and 37, respectively, into a blending tank 25 by means of pump 42 in order to produce the diluent for paint, coatings, cosmetic varnishes, ink or for adhesives.

Hence, the mixture could undergo many cycles until the solid content of waste reaches the level of 70% in parts by weight. At each cycle, the temperature of mixer-reactor 2 is lowered a little bit below the initial boiling temperature of the content in order to eliminate the chance of having an uncontrolled fractionation. At each cycle, a new waste is introduced manually or brought in automatically in response to a level detector sensor 7 by opening valve 3 and running inlet waste pump 40. This new entry is conditionally governed by the level of non-recyclable remaining solid waste. Hence, the operational conditions of the running of the plant depends mainly on the waste nature and identity as well as to their physical parameters and to as far as the viscosity at conditions of work. These two conditions are very much varying; for instance, continuous operations have been undergone at more than ten cycles before a complete stop of the plant was implemented in order to remove the solid mud.

If the operation is desired to be followed, the inconvenience could possibly be a difficulty in removing the wastes at a later stage or the complete halt of the central rotary anchor provoked by the consistency of solid wastes in the bottom part of mixer-reactor 2. At this stage and with the help of a torsion bar 6 and of the level detector-sensor 7, the specific gravity of the remaining waste left in function of its volume could govern the halt of the plant.

The conditions of fractionation in vacuum is an advantage that should be taken into consideration for some heat degradable solvents before their distillation temperature under normal conditions, such as the high naphtha grades and the aliphatics at distillation temperatures range above 170° C. at 760 mm Hg.

This halt is not in a way the only one. A short cut circuit 46 could be actioned at thermometer 47 of mixer-reactor 2 in case of overheating. Another short-cut circuit 39 is designed at the top level of column 16 coupled to its level detector 17.

The following example further illustrates the invention but is not to be construed as limitation on the scope of the invention contemplated herein.

Example 1

A laboratory plant set-up has been made for the recovery of solvents frown the liquid waste from a paint factory. Waste in the amount of 2000 ml of waste was subjected to the process of the present invention. Recovery of 95% of the volatile equivalent to 1805 ml was achieved with the following characteristics:

| Waste Chemical Analysis | | Aliquot No. | Fractionation % Recovery at 760 mm | |
|---|---|---|---|---|
| Acid Value | 8 | 1 | ml | °C. |
| Hydroxyl Value | 80 | 2 | 10 | 56 |
| Saponification Value | 250 | 3 | 5 | 75 |
| Percentage Solids | 5 | 4 | 15 | 79–80.5 |
| Percentage Ash | 1.2 | 5 | 55 | 108–112 |
| Percentage Nitrogen | 0 | | | |
| Percentage Chlorine | 0 | | | |

Analysis by chromatographic column identified aliquot No. 1 as acetone, aliquot No. 2 as ethyl acetate, aliquot No. 3 as ethyl methyl ketone, and aliquot No. 4 as n-propanol and No. 5 as toluene. This mixture was blended in order to make 1000 ml of diluent with a composition of 70% toluene, 20% propanol, 5% ethyl acetate, and 5% methyl ethyl ketone. This composition has been used as a diluent for an industrial lacquer top coat.

While preferred embodiments of the invention have been shown and described, modifications thereof can be made by one skilled in the art without departing from the spirit of the invention.

I claim:

1. A method for the recovery of solvents from a liquid solvent waste from a facility that manufactures coatings, ink, lacquer, adhesive or dyes, the recovered solvents being suitable for mixing to produce an industrial diluent, comprising the steps of:

heating the liquid solvent waste in a mixer-reactor to generate a vapor;

flowing the vapor into a distillation column;

distilling the vapor to form distillation components; and transferring each component to a separate tank which is designated for such component, the separate components being the recovered solvents.

2. A method for the production of an industrial diluent, comprising the steps of:

heating a liquid solvent waste from a facility that manufactures coatings, ink, lacquer, adhesive or dyes in a mixer-reactor to generate a vapor;

flowing the vapor into a distillation column;

distilling the vapor to form distillation components;

transferring each component to a separate tank which is designated for such component; and mixing at least two of the components in a predetermined amount to produce the industrial diluent.

3. The method according to claim 1, wherein the heating step is effected by applying heat substantially uniformly to the liquid solvent waste.

4. The method according to claim 1, further including the step of thoroughly mixing the liquid solvent waste during the heating step.

5. A process for the production of industrial diluents, comprising the steps of:

heating a liquid solvent waste in a vessel to generate a vapor, the liquid solvent waste being waste from a coating, an ink, a lacquer, an adhesive or a dyeing industry;

flowing the vapor into a fractionating column;

condensing the vapor many times along the fractionating column;

finally condensing the vapor in a condenser to form separate distillates;

recovering the separate distillates in separate tanks which are connected to a mixing tank;

flowing distillates from the separate tanks to the mixing tank; and mixing the distillates in the mixing tank to produce the diluents.

6. The process according to claim 5 further including the steps of:

forming a solid residue in the vessel; and removing the residue from the vessel.

7. The process according to claim 5 further including the steps of:

heating the liquid waste in the vessel in a homogeneous manner by a thermo-fluid flowing through a coil that is disposed around the vessel; and insulating the coil to reduce heat loss.

8. The process according to claim 5, further including the steps of:

first recovering the distillates in the condenser; and conducting an analytical and volumetric identification prior to the step of recovering the distillates in the separate tanks.

9. The process according to claim 5 wherein the separate distillates are six separate categories of compositions of aromatic, aliphatic, glycolic, ketonic, alcoholic and esters and each of these separate categories is received in a separate tank which is designated to receive each separate category.

10. A process for the recovery of solvents from a liquid solvent waste that contains the solvent to be recovered and which is a liquid waste effluent from a coating, an ink, a lacquer, an adhesive or a dyeing industry, the recovered solvents being suitable for blending to produce diluents, comprising the steps of:

heating the liquid waste in a vessel to generate a vapor;

flowing the vapor into a fractionating column;

condensing the vapor many times along the fractionating column;

finally condensing the vapor in a condenser to form separate distillates; and recovering the separate distillates in separate tanks, the separate distillates being the recovered solvents.

11. The process according to claim 10 further including the steps of:

forming a solid residue in the vessel; and removing the residue from the vessel.

12. The process according to claim 10 wherein, in the heating step, the liquid waste is heated in the vessel in a homogeneous manner by a thermo-fluid flowing through a coil that is disposed around the vessel and which is insulated to reduce heat loss.

13. The process according to claim 10, further including the steps of:

first recovering the distillates in the condenser; and conducting an analytical and volumetric identification prior to the step of recovering the distillates in the separate tanks.

14. The process according to claim 10 wherein the separate distillates are six separate categories of compositions of aromatic, aliphatic, glycolic, ketonic, alcoholic and esters and each of these separate categories is received in a separate tank which is designated to receive each separate category.

15. The process according to claim 10, further including the steps of:

first recovering the distillates in the condenser; and flowing the distillates to a column prior to the step of recovering the distillates in the separate tanks.

16. The method according to claim 2, wherein the heating step is effected by applying heat substantially uniformly to the liquid solvent waste.

17. The method according to claim 2, further including the step of thoroughly mixing the liquid solvent waste during the heating step.

* * * * *